No. 820,457. PATENTED MAY 15, 1906.
G. A. WESTOVER.
BELT SHIFTER AND REPLACER.
APPLICATION FILED JAN. 4, 1905.

2 SHEETS—SHEET 1.

Witnesses
E. W. Stewart
Jno. E. Parker

George A. Westover,
Inventor
by C. A. Snow & Co.
Attorneys

No. 820,457. PATENTED MAY 15, 1906.
G. A. WESTOVER.
BELT SHIFTER AND REPLACER.
APPLICATION FILED JAN. 4, 1905.

2 SHEETS—SHEET 2.

Witnesses

George A. Westover, Inventor
by C. A. Snow & Co.
Attorneys

UNITED STATES PATENT OFFICE.

GEORGE A. WESTOVER, OF WESTHOPE, NORTH DAKOTA.

BELT SHIFTER AND REPLACER.

No. 820,457.　　　Specification of Letters Patent.　　　Patented May 15, 1906.

Application filed January 4, 1905. Serial No. 239,658.

*To all whom it may concern:*

Be it known that I, GEORGE A. WESTOVER, a citizen of the United States, residing at Westhope, in the county of Bottineau and State of North Dakota, have invented a new and useful Belt Shifter and Replacer, of which the following is a specification.

This invention relates to belt-replacing devices, and has for its principal object to provide a novel mechanism that is partly automatic in its nature and in which all of the parts assume a predetermined initial position after each operation.

With this and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
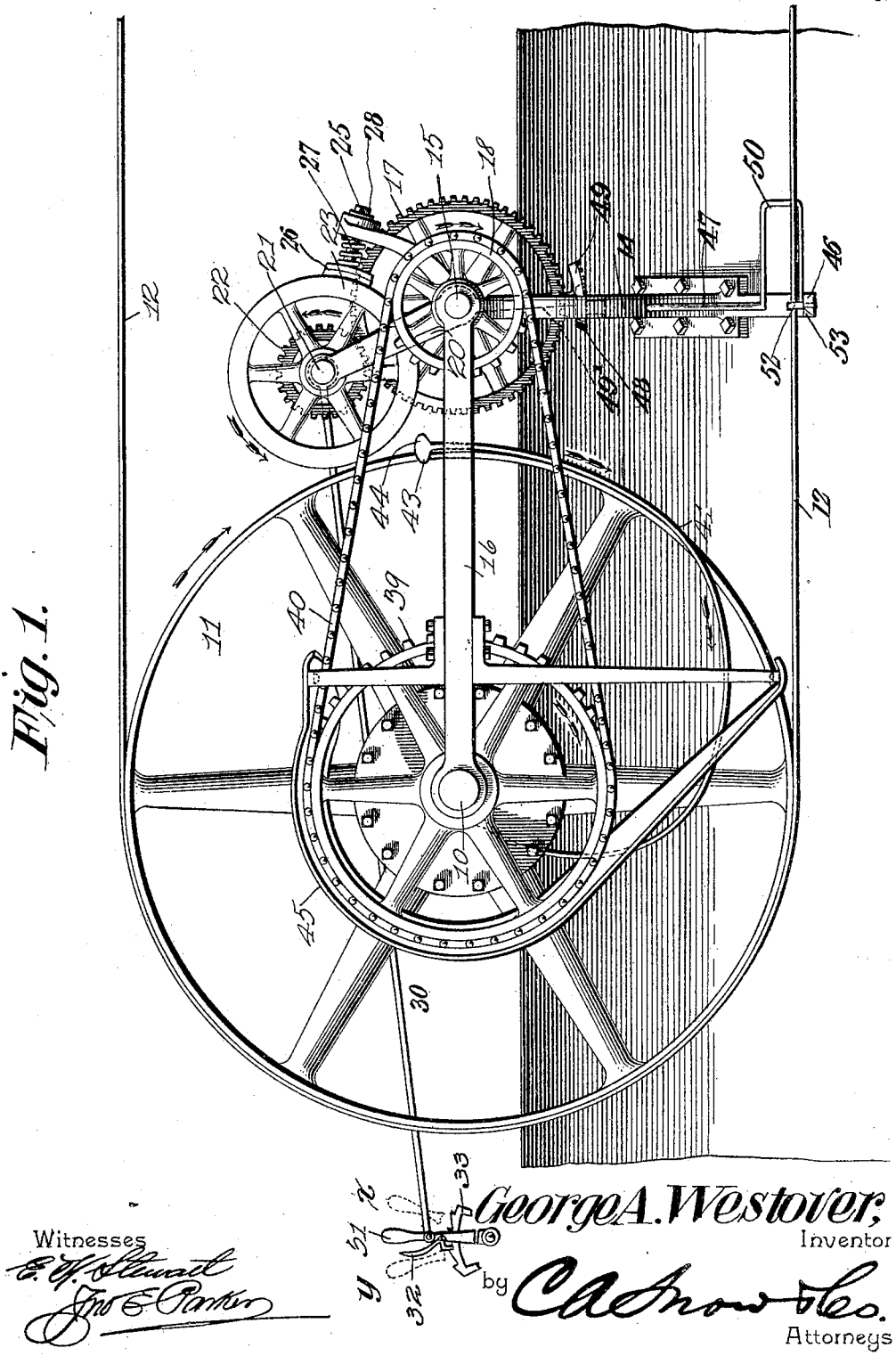
Figure 2:
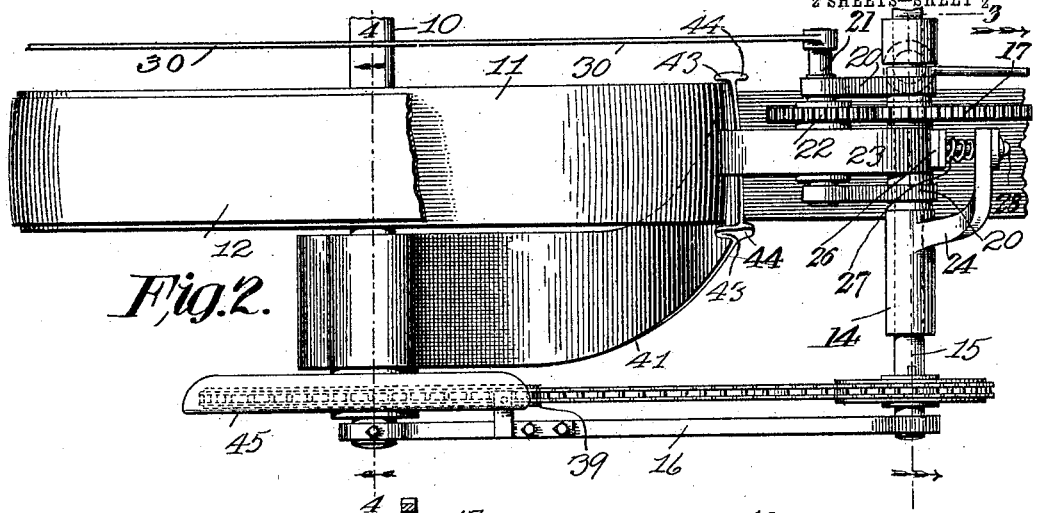
Figure 3:
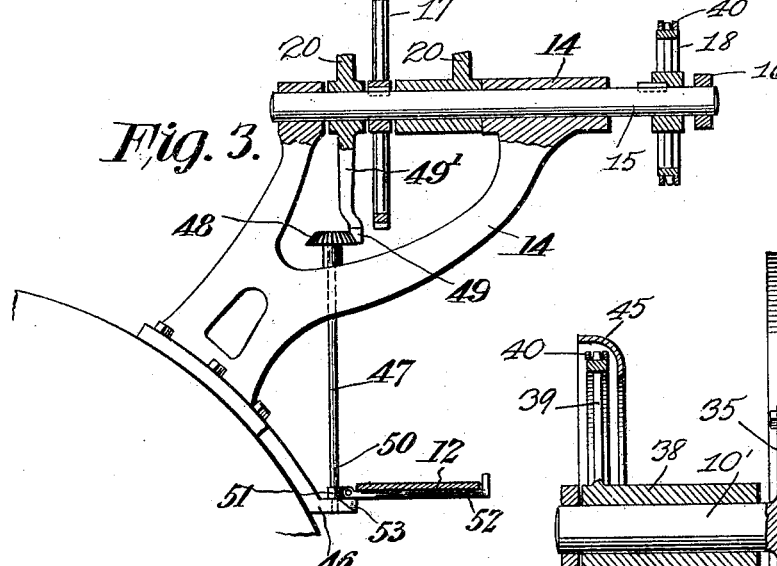
Figure 4:
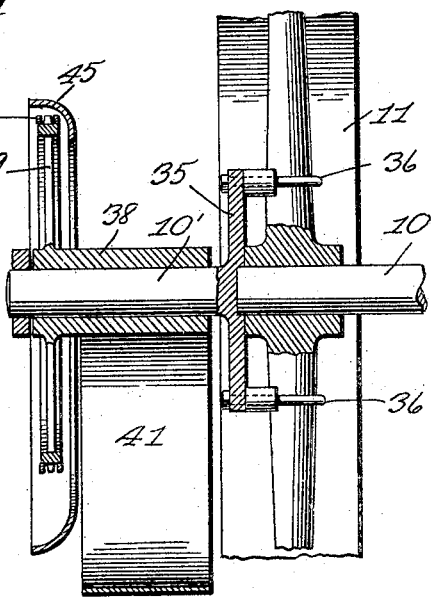

In the accompanying drawings, Figure 1 is a side elevation of a belt shifting and replacing mechanism constructed in accordance with the invention, showing the same as applied to a portable engine. Fig. 2 is a plan view of the same. Fig. 3 is a transverse sectional elevation of a portion of the mechanism on the line 3 3 of Fig. 2. Fig. 4 is a similar view on the line 4 4 of Fig. 2.

Similar numerals of reference are employed to indicate corresponding parts throughout the several figures of the drawings.

The main shaft 10 is driven direct from an engine or other suitable source of power and is provided with a pulley 11, over which passes a belt 12, the latter serving to transmit the power to any machinery to be driven. This shaft may be supported on suitable bearings and may form a part of an engine of any character.

At a short distance from the main shaft 10 are arranged bearings 14 for the support of a shaft 15, that is parallel with said shaft 10 and is connected thereto by a bracing-bar 16. To the shaft 15 is secured a large gear-wheel 17 and a sprocket-wheel 18, and said shaft further forms a fulcrum for a pair of loose rocker-arms 20, that are provided at their upper ends with bearings for the support of a short shaft 21, carrying a pinion 22, that intermeshes with the gear 17. The shaft 21 carries a friction-wheel 23, which may move into contact with the periphery of the main driving-wheel 11 and receive motion therefrom. The bearing 14 carries an arm 24, the upper end of which serves as a support for a pin 25, that carries at one end a brake-shoe 26. This block is normally pushed in the direction of the wheel 23 by means of a spring 27; but its movement in the direction of the wheel is limited by a stop-pin 28, carried by the pin 25.

To the shaft 21 is connected one end of a rod 30, the opposite end of which is connected to a suitable operating-lever 31, arranged at any convenient point, said lever having a pawl 32, which may be engaged with a rack 33 in order to lock the lever in the position indicated at $x$, Fig. 1. The normal position is that shown in full lines in Fig. 1, and when the belt is to be restored to the wheel the lever is moved to the dotted-line position $y$, this causing the friction-wheel 23 to move into contact with the periphery of the main belt-wheel 11.

The main driving-shaft 10 is extended for some distance beyond the belt-wheel, or, as shown in Fig. 4, a separate section 10' may be coupled on. This may be accomplished by providing the section 10' with a disk 35, that is connected by suitable staples or yoke-bolts 36 to the radial arms of the pulley. On the shaft-section 10' is a loose hub 38, that is provided at one end with a sprocket-wheel 39, over which extends a link belt 40, the latter passing also over the sprocket-wheel 18. This hub 38 further carries a curved belt-replacing strip 41, preferably formed of steel and following an approximately cycloidal line from the hub to the periphery of the pulley 11. The outer portion of the arm is bent over the face or rim of the pulley and at its free end is provided with a pair of ears or lugs 43, which engage with the edges of the rim and prevent lateral displacement of the strip. This strip is further provided with a lug 44 to prevent excessive movement of the belt during the replacing operation. The sprocket-wheel 39 is protected by a gear-case 45, that is supported by the connecting-bar 16 or is otherwise so arranged as to prevent contact between the belt and the teeth of the sprocket-wheel when the belt is removed from the pulley.

At a point adjacent to the lower line of the belt is a bracket 46, which forms in connection with the main bearing or bracket 14 a support for a vertically-disposed crank-shaft 47, and on said shaft is secured a bevel-pinion 48, that intermeshes with the teeth 49 of a rack that is carried by an arm 49', depending from one of the arms 20. When the two arms 20 are rocked in a direction away from the main belt-wheel 11, the rack 49 will engage with and turn the gear 48 and the crank 50 at the lower end of the shaft will be moved outward and by engagement with the belt will force the latter from the periphery of the belt-wheel 11. To the extreme lower end of the shaft 47 is secured a collar on which is pivoted a belt-supporting arm 52, which normally is held in a horizontal plane directly under the belt by means of the bracket 46, and when the arm is turned outward it will ride down the cam-shaped face 53 of the bracket and fall to an approximately vertical position and permit the belt to drop. When the parts are turned in the opposite direction, the arm 52 will be gradually raised under the belt and again restored to the horizontal position.

When the parts are in the position shown in the drawings and it is desired to remove the belt from the pulley, the operating-lever 31 is moved to the dotted-line position $x$. This movement is transmitted to the shaft 21, and the arms 20 swing rearward on the shaft 15. This movement is transmitted through the rack 49 to the shaft 47, and the cranked end 50 of the shaft then engages and forces the belt outward from contact with the main belt-wheel. When it is desired to replace the belt, the operating-lever 31 is shifted to the dotted-line position $y$. This movement is transmitted through the rod 30 to shaft 21, and as the arms 20 swing forward the friction-wheel 23 will engage the periphery of the belt-wheel. The rotative movement imparted to the friction-wheel is transmitted through the pinion 22 to the gear 17, thence through shaft 15 to sprocket-wheel 18, and through link belt 40 to the sprocket-wheel 39. This movement drives the replacing-strip 41, and the latter moves into contact with the belt and gradually carries the latter over the rim of the pulley, the replacing operation being completed by the time the strip has made three-fourths of a revolution. After the free end of the strip moves from between the rim of the belt-wheel and the belt it passes between the friction-wheel 23 and the rim of said belt-wheel, and the friction-wheel 23 is forced outward from engagement with the belt-wheel and into contact with the brake-shoe 26, so that its movement will be shifted, and the strip 41 will be stopped in approximately the same position at each operation. Rearward movement of the lever 31 will be prevented by the locking-pawl 32, so that the pulley 23 cannot be accidentally moved against the belt-wheel. It will be noted that the strip is arranged between the two runs of the belt, but not in any position to interfere with either the belt or the wheel around which it passes.

It will be observed that the gearing connections are such that the belt-replacing strip will revolve at a speed less than the peripheral speed of the main belt-pulley, so that the belt will be caught on the surface of the pulley and the operation rendered more certain than where the replacing-strip moves at the same speed or at a speed greater than that of the pulley.

Having thus described the invention, what is claimed is—

1. The combination with a pulley, of a belt-replacing means, and mechanism operable from the pulley for rotating the same at a speed different from the peripheral speed of the pulley.

2. The combination with a pulley, of a belt-replacing means operable from the pulley for revolving the replacing means at a speed less than the peripheral speed of the pulley.

3. The combination with a pulley, of a belt-replacing strip disconnected from the pulley and having one of its ends extending over the periphery of the pulley, and means for transmitting rotative movement from the pulley to the strip.

4. The combination with a pulley, of a belt-replacing means normally disconnected from the pulley, and means movable into engagement with the periphery or belt-surface of the pulley for imparting movement from the pulley to the replacing means.

5. The combination with a pulley, of a belt-replacing strip, and means operable from the periphery of the pulley for revolving the strip at a speed different from the peripheral speed of the pulley.

6. The combination with a pulley, of a belt-replacing strip, and means operable from the periphery of the pulley for revolving such strip at a speed less then the peripheral speed of the pulley.

7. The combination with a pulley, of a belt-replacing strip having oppositely-directed lugs, one for engaging the side of the pulley-rim, and the other for engaging the side of the belt.

8. The combination with a pulley, of a revoluble belt-replacing strip having its axis of rotation coincident with that of the pulley, and means operable from the periphery of the pulley for revolving said strip at a speed different from the peripheral speed of the pulley.

9. The combination with a pulley, of a revoluble belt-replacing strip, a friction-roller movable into contact with the periphery of the pulley, and gearing connections between the friction-roller and the strip.

10. The combination with a pulley, of a revoluble belt-replacing strip, a friction-roller movable into engagement with the pulley, gearing connections between the friction-roller and the strip, said strip serving to remove the roller from engagement with the pulley at the end of each operation.

11. The combination with a pulley, of a friction-roller movable into contact with the periphery of the pulley, means normally holding said friction-roller in inoperative position, a belt-replacing strip, and gearing connections between the roller and the strip.

12. The combination with a pulley, of a revoluble belt-replacing strip, a pivotally-mounted frame, a friction-roller supported thereby and movable into engagement with the periphery of the pulley, means for supporting the frame in inoperative position, and gearing connections between the friction-roller and the strip.

13. The combination with a pulley, of an independently-revoluble belt-replacing device, a shaft, a pair of rocker-arms supported thereon, a second shaft carried by the rocker-arms, gears between the two shafts, a friction-wheel mounted on the second shaft and movable into contact with the pulley, and gearing connections for transmitting the movement of the first shaft to the belt-replacing strip.

14. The combination with a main shaft, of a pulley mounted thereon, a second shaft parallel with the first, a belt-replacing strip having its axis of rotation coincident with the main shaft, a sprocket-wheel secured to said replacing-strip, a sprocket-wheel and gear-wheel carried by said second shaft, a link belt connecting the two sprocket-wheels, a pair of rocker-arms mounted on the second shaft, an auxiliary shaft carried by the rocker-arms, a friction-wheel and a pinion carried by said auxiliary shaft, means for holding the friction-wheel from contact with the face of the pulley, and an operating-lever connected to said auxiliary shaft.

In testimony that I claim the foregoing as my own I have hereto affixed my signature in the presence of two witnesses.

GEORGE A. WESTOVER.

Witnesses:
V. ORMSBY SOULE,
A. F. DOHERTY.